United States Patent
Huang

(10) Patent No.: US 10,225,358 B2
(45) Date of Patent: Mar. 5, 2019

(54) PAGE PUSH METHOD, DEVICE, SERVER AND SYSTEM

(71) Applicant: ZTE CORPORATION, Shenzhen, Guangdong Province (CN)

(72) Inventor: Sunliang Huang, Shenzhen (CN)

(73) Assignee: XI'AN ZHONGXING NEW SOFTWARE CO., LTD., Xi'an, Shaanxi (CN)

( * ) Notice: Subject to any disclaimer, the term of this patent is extended or adjusted under 35 U.S.C. 154(b) by 96 days.

(21) Appl. No.: 15/119,131

(22) PCT Filed: Sep. 15, 2014

(86) PCT No.: PCT/CN2014/086561
§ 371 (c)(1),
(2) Date: Aug. 16, 2016

(87) PCT Pub. No.: WO2015/123990
PCT Pub. Date: Aug. 27, 2015

(65) Prior Publication Data
US 2017/0064023 A1 Mar. 2, 2017

(30) Foreign Application Priority Data
Feb. 20, 2014 (CN) .......................... 2014 1 0057843

(51) Int. Cl.
*H04L 29/08* (2006.01)
*H04L 29/06* (2006.01)

(52) U.S. Cl.
CPC ............ *H04L 67/26* (2013.01); *H04L 63/102* (2013.01); *H04L 67/02* (2013.01); *H04L 67/20* (2013.01);
(Continued)

(58) Field of Classification Search
CPC ..... H04L 63/102; H04L 67/306; H04L 67/26; H04L 67/02; H04L 67/20; H04L 67/2814
See application file for complete search history.

(56) References Cited

U.S. PATENT DOCUMENTS 8,577,732 B1    11/2013  Martin et al.
2003/0204439 A1*  10/2003  Cullen, III ..... G06Q 10/063112
                                             705/7.14
(Continued)

FOREIGN PATENT DOCUMENTS

CN          1783849 A    6/2006
CN        101655868 A    2/2010
(Continued)

OTHER PUBLICATIONS

XP032530642; A User Model-based Resource Scheduling Framework; Gunannan HU School of Computer Engineering and Science Shanghai University, Shanghai, China. et al. 2013 IEEE.

*Primary Examiner* — Oanh Duong
(74) *Attorney, Agent, or Firm* — Ling Wu; Stephen Yang; Ling and Yang Intellectual Property

(57) ABSTRACT

The embodiments of the present document provide a page method, device, server and system. Wherein, the page push method includes: sending a page push request to a centralized network management controller; acquiring user information required for page push which is returned by the centralized network management controller according to the page push request; and pushing a page to a user according to the user information.

4 Claims, 2 Drawing Sheets

(52) U.S. Cl.
CPC ........ *H04L 67/2814* (2013.01); *H04L 67/306* (2013.01)

(56) References Cited

U.S. PATENT DOCUMENTS

| | | | |
|---|---|---|---|
| 2014/0379906 A1* | 12/2014 | Agerberg | G06Q 30/0201 709/224 |
| 2015/0127718 A1* | 5/2015 | Xue | H04L 67/26 709/203 |
| 2016/0308864 A1* | 10/2016 | Qiu | H04L 63/0876 |
| 2017/0064023 A1* | 3/2017 | Huang | H04L 63/102 |

FOREIGN PATENT DOCUMENTS

| | | |
|---|---|---|
| CN | 101902493 A | 12/2010 |
| CN | 103036960 A | 4/2013 |

* cited by examiner

PAGE PUSH METHOD, DEVICE, SERVER AND SYSTEM

TECHNICAL FIELD

The present document relates to the field of a computer communication network, and in particular, to a page push method, device and system.

BACKGROUND OF THE RELATED ART

With the development of Internet, the number of smart terminals is explosively increasing, the Internet advertising market has developed rapidly, the pushing of advertisement page has become ubiquitous, and there are different ways of page push in different application scenarios and different systems.

The current ways of page pushing can be generally categorized into two types:

1. Page Push Mode with a User Application Layer Link

This type of page push is common in the Internet companies such as Internet Content Provider (ICP)/Internet Service Provider (ISP). For example, when a user is accessing a Internet website and there is an application layer link between the user and the website, the website may directly push the corresponding page to the user based on the application layer link of the user or push the corresponding page to the user with Hypertext transfer protocol (Http) redirection mode based on application layer link of the user.

2. Page Push Mode without a User Application Layer Link

This type of page push is common in network operators, third party advertisers, etc. There is no application layer link since users do not directly access the contents of network operators and third party advertisers. Hence, in this scenario, it is required to obtain the application layer link of a user at first before a page is pushed to the user, and then push the corresponding page to the user with the Http redirection mode.

Since this type of page push mode does not have the application layer link of a user, it is required to obtain the application layer link of the user at first, for example, Http request packet initiated by the user, or the critical information of the user Http request. Currently, this type of centralized page push method without the user application layer link mostly uses beam-splitting or mirroring mode to obtain Http traffic of users, and based on the analysis of the traffic, obtains the application layer link information of users. Wherein, the ways by which the user's Http traffic is acquired by beam-splitting or mirroring is substantially as follows: the beam-splitting equipment or part is deployed on the link of routers to directly realize the traffic split, or enable traffic mirroring function on the routers to obtain required user traffic. After the traffic and original packets of the user are acquired, it is to perform analysis to further obtain the application layer information of the user.

The problem of the method is that it is required to use beam-splitting or mirroring mode to obtain network traffic and perform a deep analysis for a large amount of traffic. The method at first involves the problems of network security and invasion of privacy. In addition, the page push system needs to be connected with the beam-splitting and mirroring equipment of network devices, such that the deployment of the system has poor flexibility and the device port resources need to be occupied. Furthermore, it is required to store and analyze the large amount of traffic, which brings a large amount of equipment investment consumption and high cost.

SUMMARY

The technical problems to be solved by the embodiments of the present document is to provide a page push method, device, server and system, which can improve the page push efficiency and reduce the overall deployment cost of the system, and can effectively protect the users' privacy and security of the network.

In order to solve above-mentioned technical problems, the technical solution provided by an embodiment of the present document is as follows:

A page push method, comprises:

sending a page push request to a centralized network management controller;

acquiring user information required for page push which is returned by the centralized network management controller according to the page push request; and pushing a page to a user according to the user information.

Preferably, the user information is obtained by a centralized network management controller according to the network status of the user by looking up a network status of the corresponding user in the page push request according to the page push request.

Preferably, the user information includes Http link information or Http packet abstract information of the user.

Preferably, the step of pushing a page to the user according to the user information includes:

directly pushing a page to a client of the user with the Http redirection mode according to the user information.

A page push device, comprises:

a request module, configured to send a page push request to a centralized network management controller;

an acquisition module, configured to acquire user information required for page push which is returned by the centralized network management controller according to the page push request;

a page push module, configured to push a page to the user according to the user information.

Preferably, the user information is obtained by a centralized network management controller according to the network status of the user by looking up a network status of the corresponding user in the page push request according to the page push request.

Preferably, the page push module is configured to use Http redirection mode to directly push a page to a client of the user according to the user information.

The embodiment of the present document further provides a page push server, which is configured to connect with a centralized network management controller through a northbound interface that is provided by the centralized network management controller, the page push server comprises the page push device as described above.

The embodiment of the present document further provides a page push system, comprising:

a page push server, configured to establish a connection with the centralized network management controller through a northbound interface that is provided by the centralized network management controller.

Preferably, the page push server comprises the page push device as described above;

The centralized network management controller is configured to return the user information required for page push to the page push server according to the page push request.

Preferably, the centralized network management controller is further configured to respectively connect with a plurality of general-purpose network devices through a southbound interface.

In the above-mentioned solution according to an embodiment of the present document, the page push server can obtain the Http link information of a specified user from a centralized network management controller based on the requirement of a specified page push, and perform a page push on a client according to the Http link information of the user, without the storage and analysis of a large amount of traffic, which can improve the page push efficiency and reduce the overall deployment cost of the system, and can effectively protect users' privacy and network security.

PREFERRED EMBODIMENTS

In order to make the technical problems to be solved by the present document, technical solution, and advantages clearer, the present document will be described below in conjunction with the accompanying drawings and specified embodiments, and the embodiments of the present document and the features in these embodiments can be in any combination with each other without conflicts.

Figure 1:
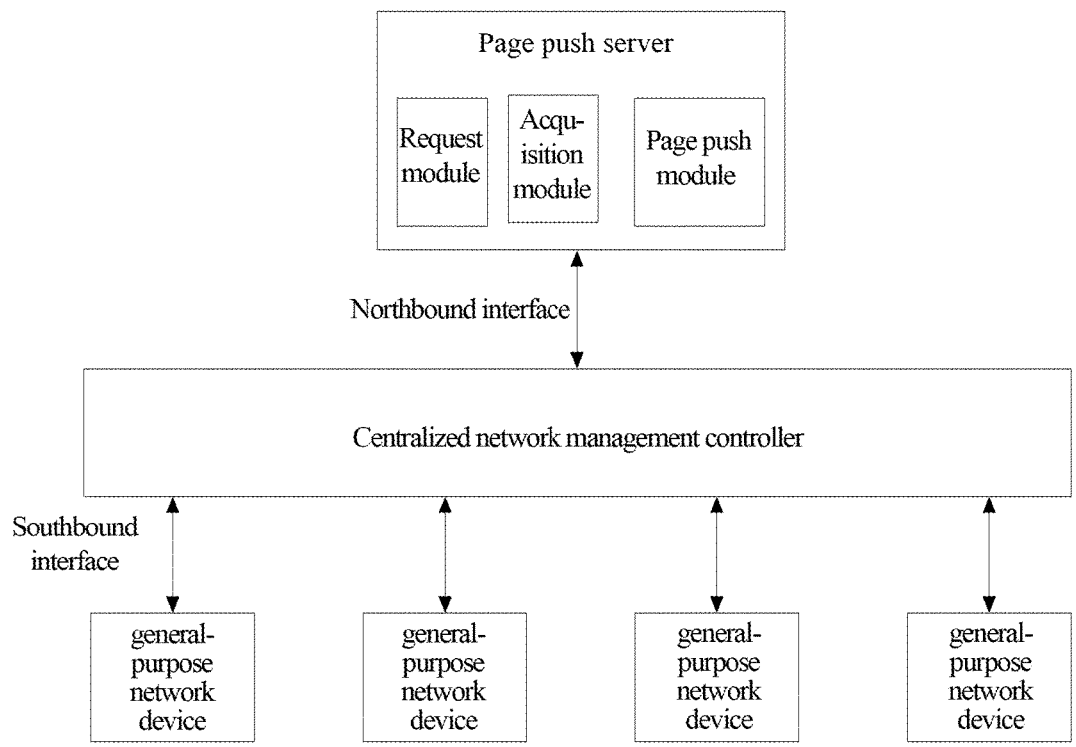
FIG. 1 illustrates an architectural schematic diagram of a page push system according to an embodiment of the present document.

As shown in FIG. 1, an embodiment of the present document provides a page push system, which comprises:

a page push server, establishing a connection with a centralized network management controller through a northbound interface provided by the centralized network management controller;

wherein, the page push server comprises a page push device; wherein the page push device includes:

a request module, configured to send a page push request to a centralized network management controller;

an acquisition module, configured to acquire user information required for page push which is returned by the centralized network management controller according to the page push request;

a page push module, configured to push a page to the user according to the user information;

the centralized network management controller returns the user information required for page push to the request module of the page push device according to the page push request.

The centralized page push system shown in FIG. 1 is realized based on a centralized network management and control architecture. A centralized network management controller is a network management and centralized control node that is specially configured in a network system.

The centralized network management controller is also connected with multiple general-purpose network devices by a southbound interface, respectively. The general-purpose network devices may be for example, routers, switches, etc., which are managed and controlled by a unified centralized network management controller. The centralized network management controller may be embodied as a network management platform in the network, an SDN controller in the SDN architecture, etc, which is a device or platform with a unified network management and control. The centralized network management controller implements the control and management of the network devices through a southbound interface, and provides network capability services to an upper system (a page push server) through a northbound interface. It should be understood that encapsulating, rearranging and scheduling the functions provided by the centralized network management controller by adding any intermediate layers, and providing the ones which are equivalent to the functions in the present method to a page push server by a northbound open interface thereof should be within the scope of the present method.

The page push server obtains network services through a northbound interface provided by the centralized network management controller. The network services include: the transfer service of the network, related status information provision of the network, user information provision carried by the network, user traffic and packet provision carried by the network.

Wherein, the page push server at least includes: a request module, configured to send a page push request to a centralized network management controller; an acquisition module, configured to acquire user information required for page push which is returned by the centralized network management controller according to the page push request; a page push module, configured to push a page to the user according to the user information.

The centralized network management controller analyzes a page push request, looks up the network status of the corresponding user in the request and determines whether a page push can be performed according to the page push request. If it is determined that a page push cannot be performed, a message of the request failure is returned to the page push server. If it is determined that a page push can be performed, the required user information is collected, such as Http link information and Http packet information of a user, etc, and the request success message is returned to the page push server, with the message attached to the Http packet abstract information of the user. Or when the request success message is returned, one Http link request packet of the user is copied and forwarded.

When determining whether a page push can be performed, whether a user can push a page can be determined specifically based on the network status of the user (e.g., the online information of the user), user attributes (e.g., the service level of the user, location information of the user), usage condition of the user (e.g., whether the user is browsing web pages), and etc.

In the above-mentioned system solution according to an embodiment of the present document, the page push server can obtain the Http link information of a specified user from a centralized network management controller based on the requirement of a specified page push based on the centralized network management controller, and directly perform a page push on a client according to the Http link information of the user, without the storage and analysis of a large amount of traffic, which can improve the page push efficiency and reduce the overall deployment cost of the system, and can effectively protect users' privacy and network security.

Figure 2:
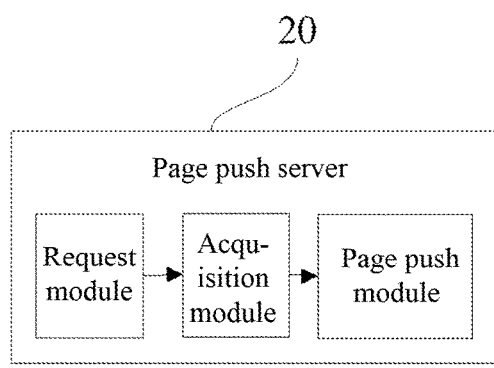
FIG. 2 illustrates a structural schematic diagram of a page push server according to an embodiment of the present document.

As shown in FIG. 2, an embodiment of the present document further provides a page push server, which is connected with a centralized network management controller through a northbound interface provided by the centralized network management controller, the page push server includes a page push device; wherein the page push device includes:

a request module, configured to send a page push request to a centralized network management controller;

an acquisition module, configured to acquire user information required for page push which is returned by the centralized network management controller according to the page push request;

a page push module, configured to push a page to the user according to the user information.

Wherein, the user information is obtained by a centralized network management controller according to the network status of the user by looking up the network status of the corresponding user in the page push request according to the page push request.

Wherein, the user information includes the Http link information or Http packet abstract information of the user.

Wherein, the page push module is configured to directly push a page to a client of the user with the Http redirection mode according to the user information.

The embodiment of this page push server sends a page push request to a centralized network management controller and receives the user information returned by the centralized network management controller through a request module, an acquisition module and a page push module. The information returned by the centralized network management controller includes related information required for page push; after receiving the related information required for page push, the acquisition module sends the related information required for page push to the page push module. The page push module pushes the corresponding page to the user.

Similarly, based on a centralized network management controller, the page push server can obtain the Http link information of a user from a centralized network management controller based on the requirement of a page push, and directly perform a page push on a client according to the Http link information of the user, without the storage and analysis of a large amount of traffic, which can improve the page push efficiency and reduce the overall deployment cost of the system, and can effectively protect users' privacy and network security.

Figure 3:
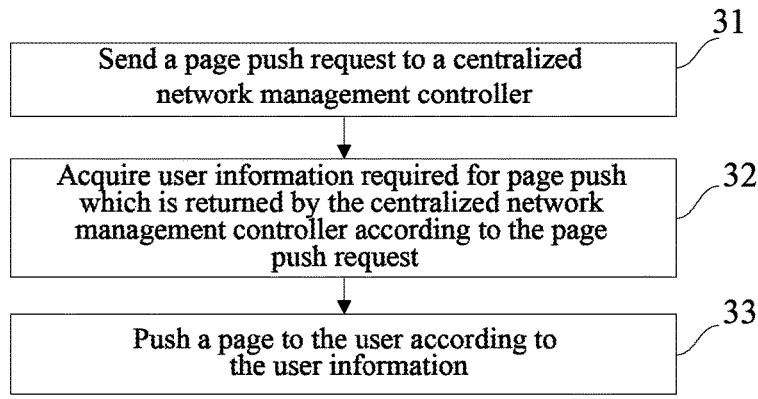
FIG. 3 illustrates a flow schematic diagram of a page push method according to an embodiment of the present document.

As shown in FIG. 3, an embodiment of the present document further provides a page push method, the method comprising:

in step31, a page push request is sent to a centralized network management controller;

in step32, user information required for page push is acquired, which is returned by the centralized network management controller according to the page push request;

in step33, a page is pushed to the user according to the user information.

Wherein, in the above-mentioned step 32, the user information is obtained by a centralized network management controller according to the network status of the user by looking up the network status of the corresponding user in the page push request according to the page push request.

Wherein, the user information includes: Http link information or Http packet abstract information of the user.

Wherein, the above-mentioned step 33 includes: a page is directly pushed to a client of the user with the Http redirection mode according to the user information.

Figure 4:
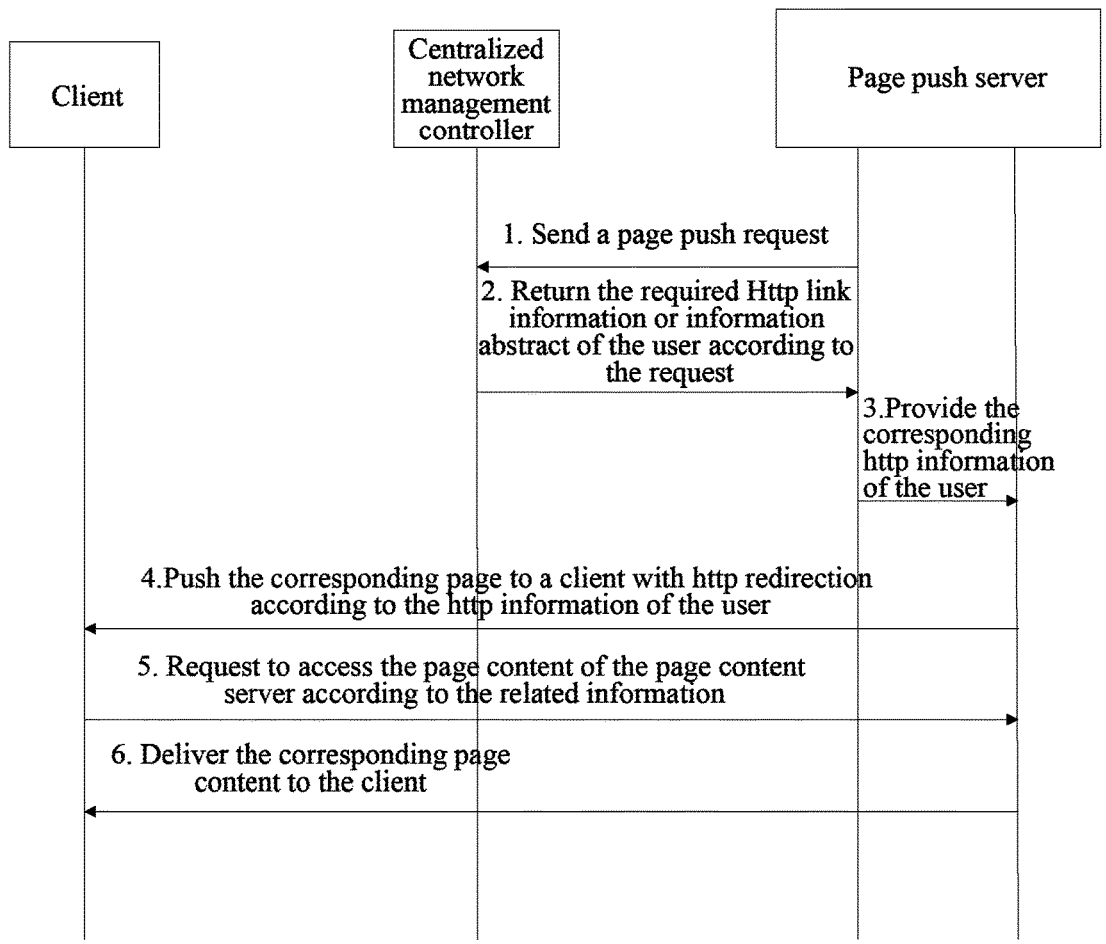
FIG. 4 illustrates a service flow chart of one specified implementation of a page push method according to an embodiment of the present document.

The process for processing services is shown as FIG. 4:

(a) In the case that a page push server needs to perform a page push for a user, a page push request is sent to a centralized network management controller by the request module.

(b) After receiving the page push request, the centralized network management controller analyzes the request, looks up the network status of the corresponding user in the request and determines whether a page push can be performed. If it is determined that the page push cannot be performed, a message of the request failure is returned to the page push server; if it is determined that the page push can be performed, the required user information is collected, such as Http link information and Http packet information of the user, etc, and the request success message is returned to the page push server, with the Http packet abstract information of the user attached. Or when the request success message is returned, one Http link request packet of the user is copied and forwarded. When the centralized network management controller is collecting the required user information, the user information may specifically include the online information and page access information of the user. Wherein, the online information of the user may be obtained by querying the BRAS equipment, AAA, or the like system, if the centralized network management controller itself contains user status management, then the online information of the user may be obtained by querying itself maintained user status information; after a page push request of a specified user is received, for the page access information of the user, a page access intercept instruction for a network device corresponding to the specified user can be sent, and when the user accesses a web page, the page access information of the user is automatically intercepted and is reported to the centralized network management controller.

(c) After receiving the request success message, the acquisition module of the page push server analyzes the acquired Http packet or the Http packet abstract information, and provides the Http link information of the user to the page push module.

(d) The page push module of the page push server pushes the corresponding page to a client with the Http redirection mode according to the acquired Http link information of the user.

(e) The client requests to access the corresponding content page according to the redirection information; the specified page content server may be deployed separately, and may be deployed together with the page push server.

(f) After receiving the page access request of a client, the page content server delivers the corresponding page content to the client.

The above-mentioned method according to an embodiment of the present document is based on a centralized network management and control architecture; a page push server acquires the Http link information of a user from the information returned by the centralized network management controller; an acquisition module parses the information which is returned by the centralized network management controller, acquires the Http link request of the user and provides to a page push module; the page push module performs a page push on a client with the Http redirection mode according to the acquired Http link information of the user, without the storage and analysis of a large amount of the traffic, which can improve the page push efficiency and reduce the overall deployment cost of the system, and at the same time can effectively protect the users' privacy and network security.

The embodiments described above are the preferred embodiments of the present document, it should be noted that for those skilled in the art, the improvements and embellishments can also be made without departing from the principles of the present document, and these improvements and embellishments should be regarded within the protection scope of the present document.

Those skilled in the art can understand that all or parts of steps of the above-mentioned embodiments can be implemented using computer program processes, the computer program can be stored in one computer readable storage medium, the computer program is executed on the corresponding hardware platform (e.g., system, equipment, apparatus, device, etc), and when the computer program is executed, one of steps of the method embodiments or the combination thereof is included.

Alternatively, all or parts of steps of the above-mentioned embodiments can also be implemented using integrated circuits, these steps can be fabricated into individual integrated circuit modules respectively, or multiple modules or steps in these steps are fabricated into a single integrated circuit to implement. Thus, the present document is not limited to any particular combination of hardware and software.

Devices/functional modules/functional units in the above-mentioned embodiments can be implemented using a general-purpose computing device, they can be centralized on a single computing device, or distributed on the network which consists of multiple computing devices.

Devices/functional modules/functional units in the above-mentioned embodiments are implemented in the form of software functional module, and when sold or used as a separate product, it can be stored in one computer readable storage medium. The above-mentioned computer readable storage medium can be read-only memory, disk or compact disc, etc.

INDUSTRIAL APPLICABILITY

In the solution according to an embodiment of the present document, a page push server can obtain Http link information of a specified user from a centralized network management controller based on the requirement of a specified page push, and directly perform a page push on a client according to Http link information of the user, without the storage and analysis of a large amount of traffic, which can improve the page push efficiency and reduce the overall deployment cost of the system, and can effectively protect users' privacy and network security.

What is claimed is:

1. A page push method, comprising:
   sending, by a page push server, a page push request to a centralized network management controller;
   acquiring, by the page push server, user information required for page push which is returned by the centralized network management controller according to the page push request; and
   pushing, by the page push server, a page to the user according to the user information; wherein the page push server is configured to establish a connection with a centralized network management controller through a northbound interface which is provided by the centralized network management controller;
   wherein the user information is obtained by the centralized network management controller according to a network status of the user by looking up a network status of a corresponding user in the page push request according to the page push request;
   wherein the user information comprises Hypertext transfer protocol (Http) link information or Http packet abstract information of the user.

2. The page push method according to claim 1, wherein the step of pushing a page to the user according to the user information comprises:
   directly pushing a page to a client of the user with Http redirection mode according to the user information.

3. A page push server, comprising: a hardware processor; instructions stored in a non-transitory computer readable medium and executed by the hardware processor, the instructions comprising:
   a request module, configured to send a page push request to a centralized network management controller;
   an acquisition module, configured to acquire user information required for page push which is returned by the centralized network management controller according to the page push request; and
   a page push module, configured to push a page to the user according to the user information; wherein the page push server is configured to establish a connection with a centralized network management controller through a northbound interface which is provided by the centralized network management controller;
   wherein the user information is obtained by the centralized network management controller according to the network status of the user by looking up a network status of the corresponding user in the page push request according to the page push request;
   wherein the user information comprises Hypertext transfer protocol (Http) link information or Http packet abstract information of the user.

4. The page push server according to claim 3, wherein the page push module is configured to directly push a page to a client of the user with Http redirection mode according to the user information.

* * * * *